Nov. 13, 1956 — H. E. SCOTT — 2,770,471
HOLD-DOWN BAR
Filed April 11, 1955

INVENTOR.
Harry E. Scott
BY
ATTORNEY.

United States Patent Office 2,770,471
Patented Nov. 13, 1956

2,770,471

HOLD-DOWN BAR

Harry E. Scott, Englewood, Colo.

Application April 11, 1955, Serial No. 500,558

7 Claims. (Cl. 280—179)

This invention relates to means for operative association with open-top, relatively-short beds of automotive vehicles, such as "pickup" trucks, to hold and secure therein otherwise unbalanced load elements of length exceeding that of the bed, and has as an object to provide a novel and improved hold-down bar organization adapted for convenient operative association with conventional such beds.

A further object of the invention is to provide a hold-down bar for conventional truck beds that is convenient of immediate manual adjustment into and out of coacting relation with truck bed loads of diverse type and varying quantity.

A further object of the invention is to provide a hold-down bar for conventional truck beds that is readily removable and replaceable relative to an associated bed.

A further object of the invention is to provide a hold-down bar for conventional truck beds that accommodates and maintains the full capacity of the bed for loads wherewith the bar is adapted to coact.

A further object of the invention is to provide a hold-down bar for conventional truck beds that is characterized by latch means automatically resistive of load-releasing bar displacement from any operative position within the range of bar adjustment.

A further object of the invention is to provide a novel and improved construction and organization of elements constituting an adjustable hold-down bar assembly adapted for removable and replaceable association in cooperating relation with a conventional truck bed.

A further object of the invention is to provide a hold-down bar attachment for the beds of "pickup" trucks that is susceptible of expedient construction in an appropriate range of sizes from readily-available materials at low cost, that is simple, facile, and inexpensive of installation in positions of use, that is rugged and durable, and that is positive and efficient in attainment of the ends for which designed.

With the foregoing and other objects in view, my invention consists in the construction, arrangement, and operative combination of elements as hereinafter set forth, pointed out in my claims, and illustrated by the accompanying drawing, in which:

Figure 2:
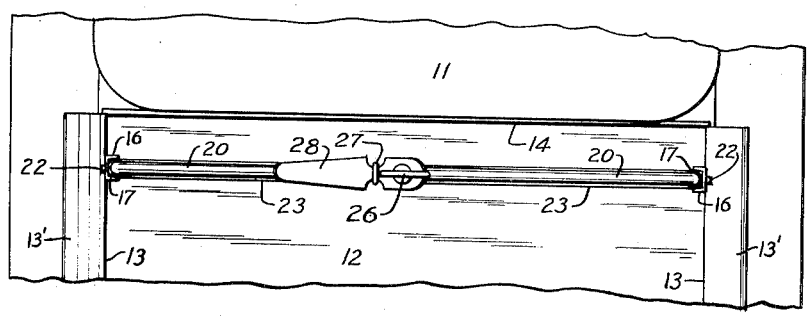
Figure 2 is a top plan view of the device of the invention and elements of the truck associated therewith as shown in Figure 1.
Figure 1:
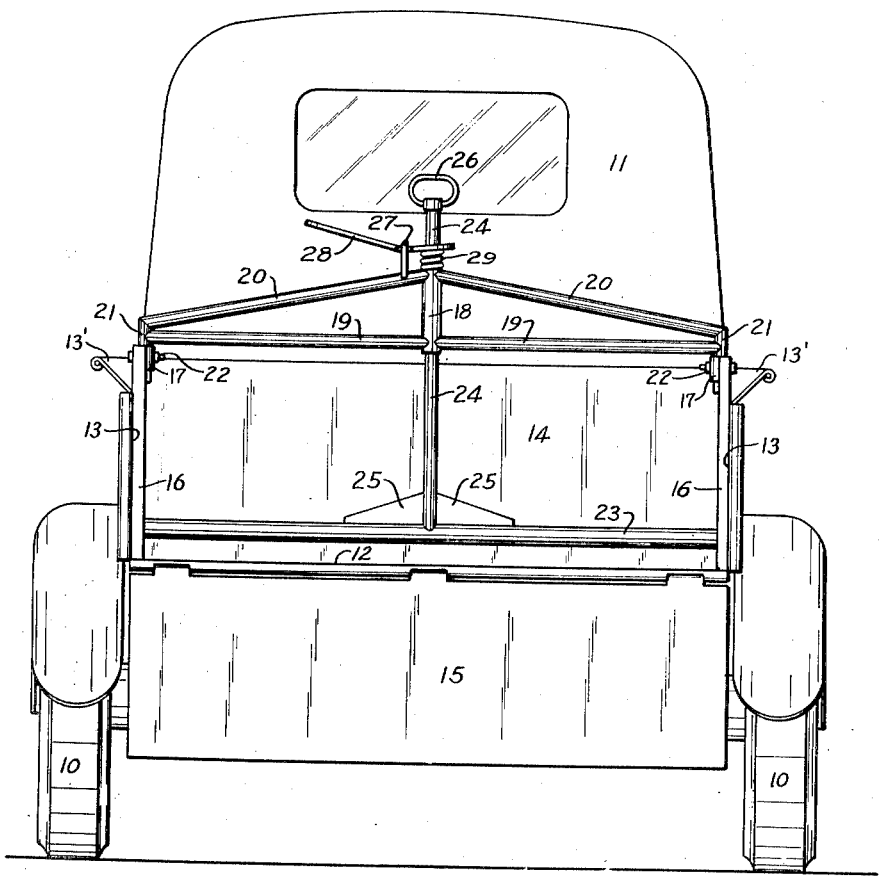
Figure 1 is a rear end elevation of a typical "pickup" truck equipped with a preferred embodiment of the invention as arranged for practical use.

In a variety of particular constructions widely in use, "pickup" trucks are distinguished as a class by an open-top, relatively-short bed mounted on an automotive chassis rearwardly of the customary cab and furnished with a hinged rear end closure, or tailboard. When applied to the transportation of materials and equipment much longer than the bed, such trucks are frequently inadequate because of the resulting load unbalance and the difficulty of securing the forward portion of the load against elevation away from the bed, hence the instant invention is directed to the provision of a hold-down bar convenient of removable and replaceable operative association with the diverse conventional constructions of such beds without impairing the general utility thereof and adjustably manipulable into and out of clamping relation with the forward end portions of long load elements supported by the bed.

In mounted association with an automotive chassis typified by the wheels 10 and rearwardly adjacent the customary cab 11 of such chassis, a truck bed of the type wherewith the improvement is especially adapted for use is illustrated as comprising the usual flat floor 12, side boards 13 in spaced, parallel relation along the opposite long margins of said floor and perpendicular thereto, a forward end closure wall 14 fixedly spanning between the forward ends of said side boards perpendicular thereto and to the floor 12, and a tailboard 15 hinged to the rearward end of said floor for selective manipulation between opening and closing relation with the rearward end of the bed, all of which, including outwardly-flared margins 13' along the upper edges of the side boards 13, is merely illustrative of conventional construction and practice.

Modification of the conventional truck bed for operative association of the invention therewith requires only the provision of like, straight, channel members 16 secured in any expedient manner, as by means of bolts, welding, or otherwise, perpendicular to the floor 12 along inner faces of the sideboards 13. The members 16 are mounted adjacent and in a like spacing from the forward end closure wall 14 of the truck bed with the channeled faces of said members directed transversely inwardly of the bed as opposed, vertical slideways. The members 16 are of a length to project at their upper ends a short distance above the side board surfaces to which they are secured, and a short, tubular sleeve 17 is fixed, as by welding, within the channel at the upper end of each said member in alignment of its bore with the channel of the associated member.

A headframe removably and replaceably engageable with and to span transversely of and above the bed between the sleeves 17 is formed as a rigid, preferably-welded, unitary assembly, expediently from stock tubular material, and is constituted as a central tubular element 18 of a size and length appropriate for its functions as hereinafter set forth, like struts 19 fixedly outstanding perpendicular to and oppositely from the lower end of said element 18, like braces 20 fixed to and adjacent the upper end of said element and extending oppositely therefrom in the plane common to the axes of said element and the struts 19 in convergent relation with the outer ends of the latter, and short legs 21 fixedly interlinking the outer ends of the strut and associated brace at each side of the element 18 in a disposition parallel to said element and in projection beyond the strut in a direction away from the brace. The length of the headframe is such as to dispose the legs 21 for telescopic engagement within the sleeves 17, whereby to mount said headframe in its intended position of use transversely of and above the bed at the upper ends of the members 16 with the element 18 vertical in the longitudinal median plane of the bed, in which use position the headframe is detachably secured by means of pins or bolts 22 engaged through registered holes diametrically of each sleeve 17 and the associated leg 21.

The actual load-clamping member of the device is a straight, rigid bar 23, preferably of tubular stock, of a length appropriate to span transversely of the bed with its ends received in and freely slidable along the channels of the members 16, which bar is operatively correlated with the headframe by means of a tubular stem 24 fixed at one end to a midpoint of the bar and extending radially of the latter loosely and slidably through the headframe element 18; the attachment of said stem to the bar being fortified by gusset plates 25 to enhance the rigidity and permanence of the connection. The stem 24 is of a length to extend through and project above the element 18 when the bar 23 rests upon the floor 12 of the bed and a loop handle 26, or the equivalent, fixed to the upper end of the stem facilitates manipulation of the latter effective in an obvious manner to raise and to lower the bar relative to and in maintained parallelism with the said floor. Since the forces which the bar 23 is designed to resist are such as tend to elevate said bar away from the floor of the bed, a simple latch is provided to oppose upward travel of the stem 24 relative to the element 18 while accommodating reverse travel of said stem. The latch has the form of a yoke 27 upstanding from one of the braces 20 spacedly adjacent the upper end of said element 18 for the hinged support of a flat, longitudinally-bent lever 28 loosely embracing the stem at its lesser end portion, and an expansive coil spring 29 about the stem between the upper end of the element 18 and the superjacent area of the said lever. The spring 29 normally biases the engaged end of the lever 28 to such angular relation with the stem 24 as will for all practical purposes inhibit upward travel of the stem until the free end of said lever is lifted to compress the spring and to retract the end of the lever about the stem away from gripping engagement therewith, but downward travel of the stem is readily accommodated by such yielding of the spring as permits the stem to slide through the end of the lever thereby traversed.

Constructed and installed as shown and described, the use and practical advantages of the improvement should be readily apparent from the foregoing. Upon removal of the pins or bolts 22, the headframe may be lifted free from the sleeves 17 and then tilted to one side or the other to free one end of the bar 23 from its sliding engagement with the associated member 16, whereafter the entire assembly may be removed from the bed to leave the latter unobstructed save for the members 16 and their sleeves 17. Alternatively, after the assembly has been released from the bed one leg 21 may be reengaged with a sleeve 17 to provide a hinge about which the assembly may be swung to longitudinal disposition within the bed and for translation therewith in non-use position, thus freeing substantially the full capacity of the latter for any desired use. Engaged in operative relation with the bed, the headframe provides a truss against which the forces of an unbalanced long load may be applied by means of the bar 23 and stem 24 in a manner to resist disengagement of the load from the bed. Through manipulation of the lever 28 and handle 26, the stem 24 and bar 23 may be elevated to accommodate such loading of long materials and equipment as may be desired and to such quantity within the capacity of the bed as may be expedient. The loading being finished to a substantially horizontal upper surface, the stem 24 is pushed toward the load and the bar 23 consequently lowered into engagement with the load upper surface near the inner or forward ends of the loaded materials, in which adjusted position the stem and bar are retained by the automatic latch to inhibit upward separation of the forward portion of an unbalanced load from the supporting floor of the bed.

Since changes, variations, and modifications in the form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. A hold-down bar for conventional truck beds comprising complementary channel members fixed at the opposite sides of the bed to extend above and perpendicular to the bed floor with their channels directed inwardly in opposition transversely of the bed, a rigid headframe detachably secured to upper ends of said members and bridging transversely of the bed therebetween, a bar spanning between and slidably engaged at its ends with said members, a stem fixed centrally of and perpendicular to said bar in slidable association with said headframe, and latch means on the latter frictionally engaged with said stem to releasably limit upward shift of the stem relative to the headframe.

2. A hold-down bar for conventional truck beds comprising complementary channel members fixed at the opposite sides of the bed to extend above and perpendicular to the bed floor with their channels directed inwardly in opposition transversely of the bed, a rigid headframe detachably secured to upper ends of said members and bridging transversely of the bed therebetween, an elongated slide bearing centrally and transversely of said headframe, a bar spanning between and slidably engaged at its ends with said members, a stem fixed centrally of and perpendicular to said bar in slidable accommodation through said bearing, and latch means on the headframe frictionally engaged with said stem to releasably limit upward shift of the stem relative to the headframe.

3. A hold-down bar for conventional truck beds comprising complementary channel members fixed at the opposite sides of the bed to extend above and perpendicular to the bed floor with their channels directed inwardly in opposition transversely of the bed, a tubular sleeve fixed to the upper end of each said member in axial alignment with the channel of the associated member, a rigid headframe detachably secured to said sleeves and bridging transversely of the bed between the upper ends of said members, an elongated slide bearing centrally and transversely of the headframe, a bar spanning between and slidably engaged at its ends with said members, a stem fixed centrally of and perpendicular to said bar in slidable accommodation through said bearing, and latch means on said headframe frictionally engaged with said stem to releasably limit upward shift of the stem relative to the headframe.

4. A hold-down bar for conventional truck beds comprising complementary channel members fixed at the opposite sides of the bed to extend above and perpendicular to the bed floor with their channels directed inwardly in opposition transversely of the bed, a tubular sleeve fixed to the upper end of each said member in axial alignment with the channel of the associated member, a rigid headframe adapted to bridge transversely of the bed between the upper ends of said members, legs extending laterally from the ends of said headframe and telescopically engaged with said sleeves, means detachably securing said legs in said sleeves, an elongated slide bearing centrally and transversely of the headframe parallel to said legs, a bar spanning between and slidably engaged at its ends with said members, a stem fixed centrally of and perpendicular to said bar in slidable accommodation through said bearing, and latch means on said headframe frictionally engaged with said stem to releasably limit upward shift of the stem relative to the headframe.

5. The organization according to claim 4, wherein said latch means is spring-biased into frictional engagement with the stem such as to automatically oppose travel of the stem upwardly through the associated slide bearing and to yieldably accommodate opposite travel of the stem.

6. The organization according to claim 4, wherein said latch means is a lever hinged to the headframe adjacent the upper end of the slide bearing and loosely embracing said stem at one of its ends, and an expansive spring about said stem between said lever and the upper end of the slide bearing yieldably urging the lever into gripping relation with the stem.

7. As a hold-down bar, the combination with a conventional truck bed of members at the opposite sides of the bed defining a slideway transversely of and perpendicular to the bed floor, a rigid headframe detachably bridging between said members and closing the upper end of the slideway, a rigid bar reciprocable in said slideway between said headframe and the floor of the bed, means fixed to said bar in slidable association with the headframe, and a latch on the headframe frictionally engaged with said means to releasably limit upward shift thereof relative to the headframe.

References Cited in the file of this patent
UNITED STATES PATENTS

| | | |
|---|---|---|
| 1,991,262 | Sauvage | Feb. 12, 1935 |
| 2,155,872 | Reifer | Apr. 25, 1939 |
| 2,697,631 | Miller | Dec. 21, 1954 |